(12) United States Patent
Watanabe

(10) Patent No.: US 6,437,910 B1
(45) Date of Patent: Aug. 20, 2002

(54) SCANNING CONFOCAL MICROSCOPE

(75) Inventor: Hideo Watanabe, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/035,419

(22) Filed: Oct. 25, 2001

Related U.S. Application Data

(62) Division of application No. 09/696,774, filed on Oct. 26, 2000, now Pat. No. 6,317,258, which is a continuation of application No. PCT/JP00/01623, filed on Mar. 17, 2000.

(30) Foreign Application Priority Data

Mar. 19, 1999 (JP) .......................................... 11-076720
Jun. 9, 1999 (JP) .......................................... 11-162436

(51) Int. Cl.[7] .............................................. G02B 21/00
(52) U.S. Cl. ........................ 359/368; 359/202; 359/234
(58) Field of Search ................................ 359/201, 202, 359/234, 235, 368, 383, 385, 389

(56) References Cited

U.S. PATENT DOCUMENTS 5,594,235 A    1/1997    Lee
5,923,430 A  *  7/1999    Worster et al. ............. 356/394
5,932,871 A  *  8/1999    Nakagawa et al. ...... 250/201.3
6,028,306 A    2/2000    Hayashi

FOREIGN PATENT DOCUMENTS

| JP | 48-30439 | 4/1973 |
| JP | 50-56277 | 5/1975 |
| JP | 61-56615 | 4/1986 |
| JP | 06-273118 A | 9/1994 |
| JP | 08-43017 | 2/1996 |
| JP | 08-334698 A | 12/1996 |
| JP | 10-31159 | 2/1998 |
| JP | 11-52252 | 2/1999 |

* cited by examiner

*Primary Examiner*—Mark A. Robinson
(74) *Attorney, Agent, or Firm*—Frishauf, Holtz, Goodman & Chick, P.C.

(57) ABSTRACT

This invention measures a necessary region at a high speed regardless of the scanning means, magnification, and resolution in measuring a sample. A scanning confocal microscope for two-dimensionally scanning a sample with a laser beam, receiving light reflected by the sample, fluorescence, or transmitted light, and obtaining a detection signal corresponding to the received light intensity as image information of the sample includes a scanning range designation means for designating the two-dimensional scanning range of the laser beam with respect to the sample.

6 Claims, 7 Drawing Sheets

SCANNING CONFOCAL MICROSCOPE

CROSS-REFERENCE TO RELATED APPLICATIONS

This is a division of application Ser. No. 09/696,774 filed Oct. 26, 2000, now U.S. Pat. No. 6,317,258, which is a Continuation of International Application PCT/JP00/01623, filed Mar. 17, 2000.

This application is based upon and claims the benefit of priority from the prior Japanese Patent Applications No. 11-076720, filed Mar. 19, 1999; and No. 11-162436, filed Jun. 9, 1999, the entire contents of which are incorporated herein by reference.

BACKGROUND OF THE INVENTION

The present invention relates to a scanning confocal microscope for increasing the processing speed by improving scanning control of focused light with respect to a sample and data processing.

A scanning confocal microscope utilizes a confocal effect of illuminating the surface of a sample to be observed (to be referred to as a sample hereinafter) with a light spot from a point source, focusing light transmitted through or reflected by the illuminated sample surface into a light spot again to form an image on a detector having a pinhole, and obtaining luminance information of the formed image from the detector.

A general scanning confocal microscope will be described with reference to a schematic view shown in FIG. 1.

A light spot emitted by a point source 1 passes through a half-mirror 2, and forms a spot on the surface of a sample 4 via an aberration-corrected objective lens 3.

Light reflected by the spot-illuminated sample 4 passes through the objective lens 3 again, and is reflected by the half-mirror 2 and focused. A pinhole 5 is formed at the focal position. The reflected light having passed through the pinhole 5 is detected by a photodetector 6.

The scanning confocal microscope can raster-scan the sample 4 with such a light spot to two-dimensionally scan the entire measurement region of the surface of the sample 4, and display as an image a detection signal of the reflected light obtained by the photodetector 6, thereby obtaining a two-dimensional image of the surface of the sample 4.

This two-dimensional scanning adopts, e.g., a galvanoscanner or resonant scanner for the X direction and a galvanoscanner for the Y direction.

When the X- and Y-scanners are a combination of galvanoscanners, the scanning rate of the surface of the sample 4 is about 1 image/sec. When the X-scanner uses a resonant scanner in order to increase the scanning rate, the scanning rate is about 5 images/sec. Note that the number of pixels is 1,024×768.

Such a scanning confocal microscope realizes scanning capable of obtaining an in-focus image of the entire surface of a stepped sample 4 by the above-described confocal effect (to be referred to as extended scanning).

This scanning utilizes the fact that the luminance of the sample 4 maximizes at an in-focus position. Luminance information of the sample 4 obtained at the position of the objective lens 3 (or sample 4) is compared with that of the sample 4 obtained at a position of the objective lens 3 (or sample 4) slightly shifted to the optical axis.

By leaving a pixel having a higher luminance between identical pixels of the two images, an image of the sample 4 finally obtained within a given range along the optical axis becomes an in-focus two-dimensional image of the entire surface of the sample 4.

When the luminance is determined to be higher in pixel comparison, a position along the optical axis at that time can be stored to finally attain height (three-dimensional) information of the sample 4.

In extended scanning, however, information about the height of the sample 4 or the like can be obtained only after the sample 4 is two-dimensionally scanned and the objective lens 3 (or sample 4) is moved along the optical axis within a given range. The acquisition time is determined by the scanning rate, the data processing speed, the moving time of the objective lens 3 (or sample 4), and the entire moving range. The time is much longer than the time necessary for acquiring only general two-dimensional information.

To shorten the total measurement time when one measurement operation requires a large amount of image data (luminance information), like extended scanning, the acquisition time (image update time) of luminance information of the sample 4 by two-dimensional scanning must be shortened.

When many regularly aligned stepped samples are to be successively measured, like recent bump measurement, the measurement time of the sample 4 must be shortened.

Techniques disclosed to increase the scanning rate include, e.g., two-dimensional scanning using an acoustooptical element. According to this technique, the scanning angle cannot be set large, so the entire field of view is limited.

In addition, two-dimensional scanning using a CCD line sensor cannot realize a resolution which can be obtained by a general confocal optical system.

It is, therefore, an object of the present invention to provide a scanning confocal microscope capable of measuring a necessary region at a high speed regardless of the scanning means, magnification (observation field of view), and resolution in measuring a sample.

In extended scanning, after an image is captured at a certain focal position by two-dimensional scanning, the objective lens 3 (or sample 4) is moved to the next focal position along the Z-axis at a predetermined pitch to capture the next image by two-dimensional scanning.

In general, the image capture period of two-dimensional scanning at the focal position is not synchronized with the focal position moving time. Before movement of the focal position is completed during the blanking period of scanning, image capture by two-dimensional scanning starts, and the captured image becomes wasteful data.

For this reason, the next image capture must be devoted to an idle (no-data acquisition) time. Acquiring a desired number of images requires a long time.

To shorten the image capture time, some microscopes execute focal movement of the objective lens 3 (or sample 4) while capturing images by two-dimensional scanning. In these microscopes, the focal position moves during image capture scanning, so that an image is captured by obliquely scanning a sample. Considering the process in which height information is obtained by extended scanning, no accurate information can be obtained.

The present invention has been made in consideration of the above situation, and has as its object to provide a scanning confocal microscope capable of acquiring accurate image information within a short time.

BRIEF SUMMARY OF THE INVENTION

According to the first aspect of the present invention, a scanning confocal microscope is characterized by comprising scanning range designation means for designating a two-dimensional scanning range of focused light with respect to a sample, two-dimensional scanning means for two-dimensionally scanning the sample with the focused light within the two-dimensional scanning range designated by the scanning range designation means, light-receiving means for receiving one of light reflected by the sample, fluorescence, and transmitted light of the focused light two-dimensionally scanned by the two-dimensional scanning means, and image acquisition means for acquiring an image of the sample on the basis of one of the reflected light, the fluorescence, and the transmitted light that is received by the light-receiving means.

According to the second aspect of the present invention, a scanning confocal microscope is characterized by comprising two-dimensional scanning means for two-dimensionally scanning a sample with focused light within a two-dimensional scanning range, light-receiving means for receiving one of light reflected by the sample, fluorescence, and transmitted light of the focused light two-dimensionally scanned by the two-dimensional scanning means, data acquisition range designation means for designating a data acquisition range on image data of the sample obtained based on one of the reflected light, the fluorescence, and the transmitted light that is received by the light-receiving means, and image acquisition means for acquiring an image of the sample on the basis of image data within the data acquisition range designated by the data acquisition range designation means out of the image data of the sample obtained based on one of the reflected light, the fluorescence, and the transmitted light that is received by the light-receiving means.

According to the third aspect of the present invention, a scanning confocal microscope is characterized by comprising scanning range designation means for designating a two-dimensional scanning range of focused light with respect to a sample, two-dimensional scanning means for two-dimensionally scanning the sample with the focused light within the two-dimensional scanning range designated by the scanning range designation means, light-receiving means for receiving one of light reflected by the sample, fluorescence, and transmitted light of the focused light two-dimensionally scanned by the two-dimensional scanning means, data acquisition range designation means for designating a data acquisition range on image data of the sample obtained based on one of the reflected light, the fluorescence, and the transmitted light that is received by the light-receiving means, and image acquisition means for acquiring an image of the sample on the basis of image data within the data acquisition range designated by the data acquisition range designation means out of the image data of the sample obtained based on one of the reflected light, the fluorescence, and the transmitted light that is received by the light-receiving means.

According to the fourth aspect of the present invention, a scanning confocal microscope is characterized by comprising two-dimensional scanning means for two-dimensionally scanning a sample with focused light, focal position adjustment means for adjusting a focal position of the focused light with respect to the sample, and control means for inhibiting two-dimensional scanning of the two-dimensional scanning means during a focal position adjustment period of the focal position adjustment means.

According to the fifth aspect, the fourth aspect is characterized in that the control means manages a horizontal sync signal output every 1-line scanning of the two-dimensional scanning means and a vertical sync signal output every frame scanning, instructs the focal position adjustment means to start adjusting the focal position and inhibits two-dimensional scanning of the two-dimensional scanning means in response to the vertical sync signal, and starts two-dimensional scanning of the two-dimensional scanning means after the focal position adjustment means adjusts the focal position.

According to the sixth aspect, the fifth aspect is characterized in that the control means further manages a control signal output subsequently to the vertical sync signal of the two-dimensional scanning means, when end of adjustment of the focal position by the focal position adjustment means is informed before the control signal, does not inhibit two-dimensional scanning of the two-dimensional scanning means, when end of adjustment of the focal position by the focal position adjustment means is informed after the control signal, temporarily inhibits two-dimensional scanning of the two-dimensional scanning means upon generation of the control signal, and starts two-dimensional scanning of the two-dimensional scanning means after end of adjustment of the focal position.

As a result, according to the present invention, two-dimensional scanning by the two-dimensional scanning means and movement of the focal position by the focal position adjustment means in extended scanning can be synchronized to eliminate a wasteful two-dimensional scanning period (idle period during which no data can be acquired).

Also, according to the present invention, the period between the vertical sync signal of the two-dimensional scanning means and a successively output control signal can be used for adjustment of the focal position by the focal position adjustment means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

First Embodiment

The first embodiment of the present invention will be described below with reference to the several views of the accompanying drawing.

Figure 1:
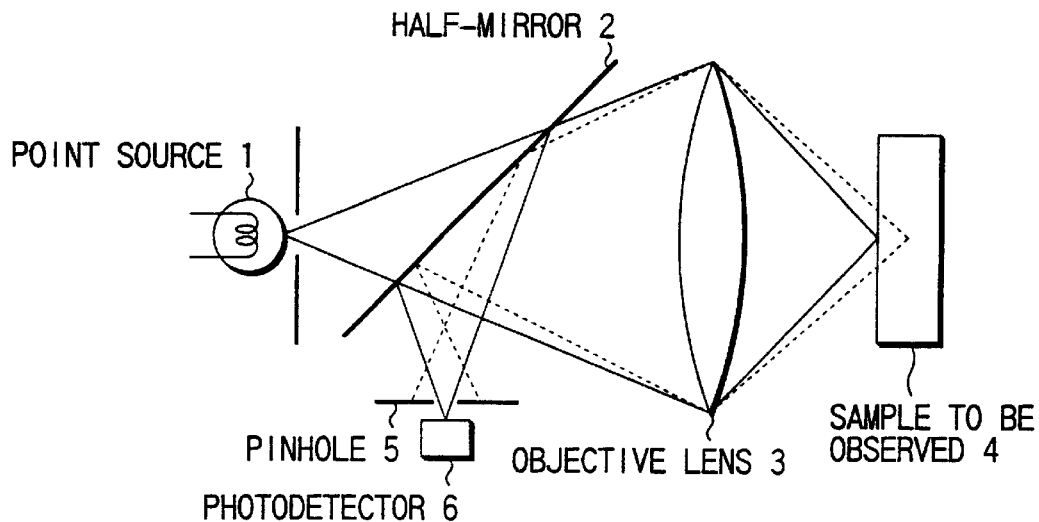
FIG. 1 is a viewing a conventional confocal microscope.
Figure 2:
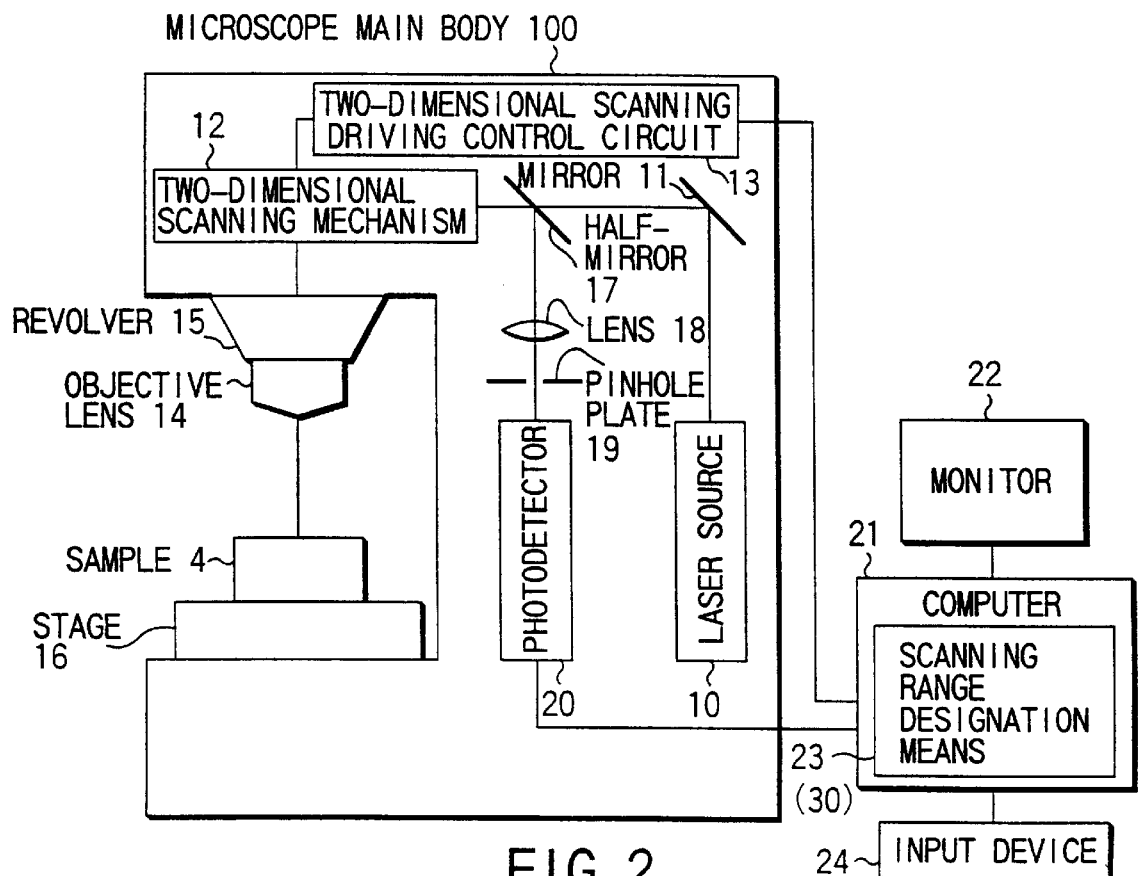
FIG. 2 is a block diagram showing a scanning confocal microscope cording to the first embodiment of the present invention.

FIG. 2 is a block diagram showing a scanning confocal microscope.

A microscope main body 100 comprises a laser source 10. The laser source 10 generates a laser beam as a light spot (focused light) for scanning the surface of a sample 4.

A mirror 11 is inserted in the optical axis of the laser source 10. The mirror 11 is a reflecting mirror for guiding a laser beam from the laser source 10 to a two-dimensional scanning mechanism 12.

The two-dimensional scanning mechanism 12 is a mechanism for two-dimensionally scanning the sample 4 with a laser beam from the laser source 10 that is obtained via the mirror 11, and XY-scans the sample 4 with a light spot under the control of a two-dimensional scanning driving control circuit 13.

The two-dimensional scanning mechanism 12 has, e.g., a resonant scanner for scanning in the X direction and a galvanoscanner for scanning in the Y direction. The two-dimensional scanning mechanism 12 drives these scanners along the X- and Y-axes to move the optical path of a light spot with respect to an objective lens 14 in the x and Y directions.

A revolver 15 holds a plurality of objective lenses 14 having different magnifications. A stage 16 holds the sample 4.

The revolver 15 is switched to set an objective lens 14 having a desired magnification among these objective lenses 14 to a position in the optical observation axis of the microscope. A light spot from the two-dimensional scanning mechanism 12 two-dimensionally scans and illuminates the sample 4 on the stage 16 via the set objective lens 14.

On the other hand, light reflected by the sample 4 passes through the objective lens 14 to return to the two-dimensional scanning mechanism 12, and returns to a half-mirror 17 via the two-dimensional scanning mechanism 12.

The half-mirror 17 is a semitransparent mirror which is inserted in the exit optical axis of the laser source 10 extending to the two-dimensional scanning mechanism 12, and guides, to a detection system, light reflected by the sample 4 that is obtained via the two-dimensional scanning mechanism 12.

A lens 18 focuses the reflected light from the two-dimensional scanning mechanism 12 that is obtained via the half-mirror 17. A pinhole plate 19 has a pinhole with a desired diameter, and is located at the focal position of the lens 18 in front of the light-receiving surface of a photodetector 20.

The photodetector 20 is a photodetection element for converting light obtained via the pinhole of the pinhole plate 19 into an electrical signal corresponding to the light quantity.

The signal photoelectrically converted by the photodetector 20 is sent together with a timing signal from the two-dimensional scanning driving control circuit 13 to a computer 21 where the signal is converted into an image. The image is displayed on a monitor 22 to obtain surface information of the sample 4.

The computer 21 has a function of a scanning range designation means 23 for designating the two-dimensional scanning range of a laser beam with respect to the sample 4.

The scanning range designation means 23 limits the range of Y-scanning on the sample 4 by the two-dimensional scanning mechanism 12. This scanning range is set by the operator from an input device 24 on the basis of surface information of the sample 4 displayed on the monitor 22. The set designation region is sent to the two-dimensional scanning driving control circuit 13. An example of the input device 24 is a mouse or keyboard.

The effects of the microscope having this arrangement will be explained.

A laser beam emitted by the laser source 10 is guided to the two-dimensional scanning mechanism 12 via the mirror 11 to scan the sample 4 along the X- and Y-axes by driving the X-scanning resonant scanner and Y-scanning galvanoscanner of the two-dimensional scanning mechanism 12.

The scanned laser beam scans and illuminates the sample 4 as a light spot via the objective lens 14.

On the other hand, light reflected by the sample 4 passes through the objective lens 14 to return to the two-dimensional scanning mechanism 12, and is incident on the photodetector 20 from the two-dimensional scanning mechanism 12 via the half-mirror 17, lens 18, and pinhole plate 19.

The photodetector 20 photoelectrically converts the incident light reflected by the sample 4, and sends the signal to the computer 21.

The computer 21 receives the signal from the photodetector 20, converts it into an image in response to a timing signal from the two-dimensional scanning driving control circuit 13, and displays the image on the monitor 22.

Figure 3:
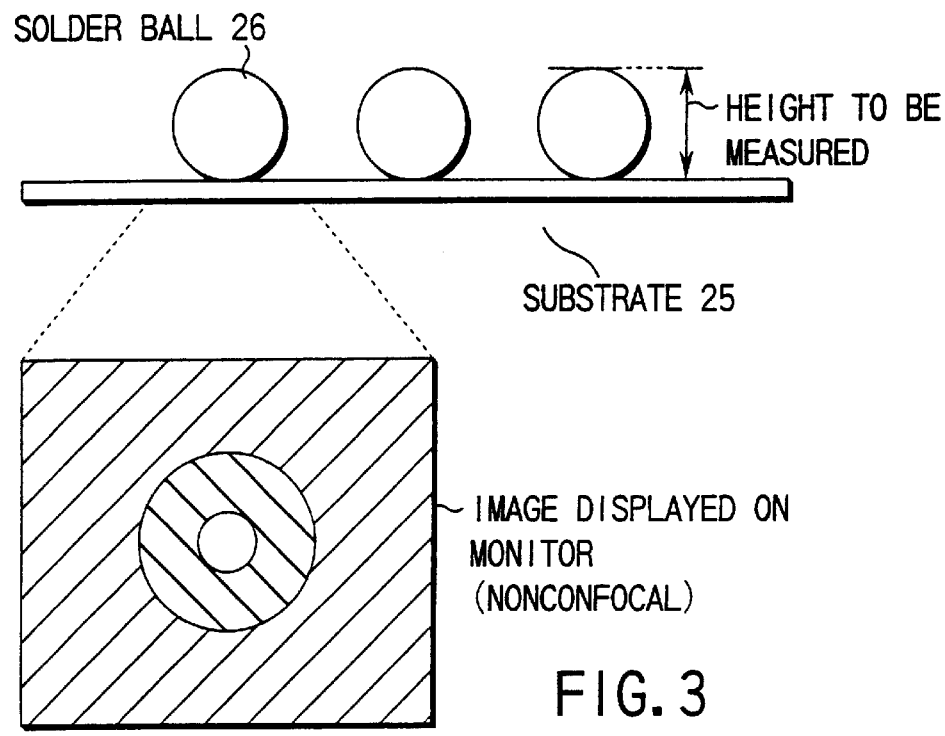
FIG. 3 is a schematic showing an image displayed on a monitor when solder balls are arrayed in a matrix on a substrate as a sample.

FIG. 3 shows an example of the sample 4 displayed as an image on the monitor 22. This image is a nonconfocal image captured to designate the scanning range. As the sample 4 to be inspected, a plurality of solder balls 26 are arrayed in a matrix on a substrate 25. Note that the top of each solder ball 26 is slightly dented.

Measurement of the height between the substrate 25 and the top of the solder ball 26 will be described. In general, to acquire surface information of the sample 4 by a scanning confocal microscope, the entire display region is scanned with a laser, as shown in FIG. 3. The update rate is about 4 images/sec (e.g., a rectangular region of 1:1 inscribed in a field number of 18; 1,024 pixels×1,024 lines).

The step between the substrate 25 and the top of the ball 26 is measured by extended scanning. When the objective lens 14 is moved along the optical axis by, e.g., 200 steps, acquiring the whole data requires about 90 sec.

About half the data acquisition time is an image acquisition time (about 50 sec), and the remaining half is a time (about 40 sec) required to mechanically move the objective lens 14.

If the objective lens 14 is moved by 1,000 steps in order to increase the precision, about 450 sec (about 7 min 30 sec) is required.

Figure 6:
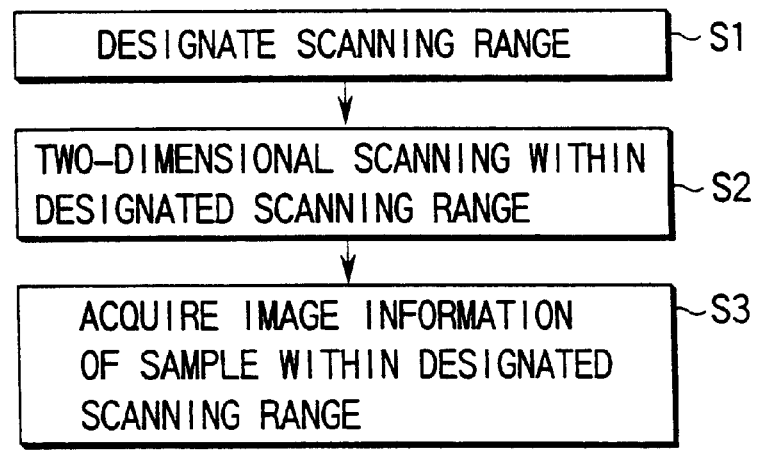
FIG. 6 is a flow chart for explaining the operation of the scanning confocal microscope according to the first embodiment of the present invention.

To the contrary, the apparatus of the present invention causes the operator of the scanning confocal microscope to designate the Y-scanning range of a laser beam from the input device 24 on the basis of surface information of the sample 4 displayed on the monitor 22 (FIG. 6:S1).

Figure 4:
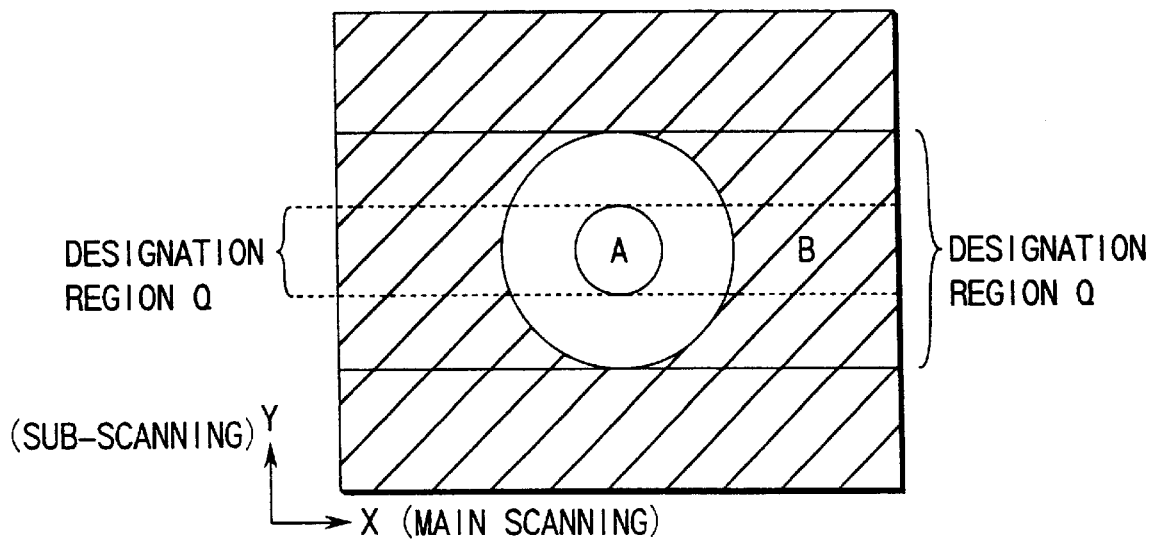
FIG. 4 a view showing region designation of image information when the two-dimensional scanning range of a laser beam is designated.

For example, the operator designates a region Q effective for measuring the height in the Y scanning direction from a displayed image using a mouse or keyboard, as shown in FIG. 4.

The designation region Q suffices to be limited to a region containing an object to be measured. Since this embodiment measures the height between points A and B, i.e., the substrate 25 and the top of the ball 26, the operator need only designate a region in the Y scanning direction that contains points A and B.

Assume that the operator selects a designation region Q large enough to contain the entire ball 26, the region need only be smaller than the entire field of view in the Y direction and in this case is half the entire field of view in the Y direction. The scanning range designation means 23 informs the two-dimensional scanning driving control circuit 13 of information of the set designation region Q, and the two-dimensional scanning driving control circuit 13 controls the Y-scanning range of a laser beam. That is, two-dimensional scanning is done in the designated scanning range (FIG. 6:S2).

Figure 5:
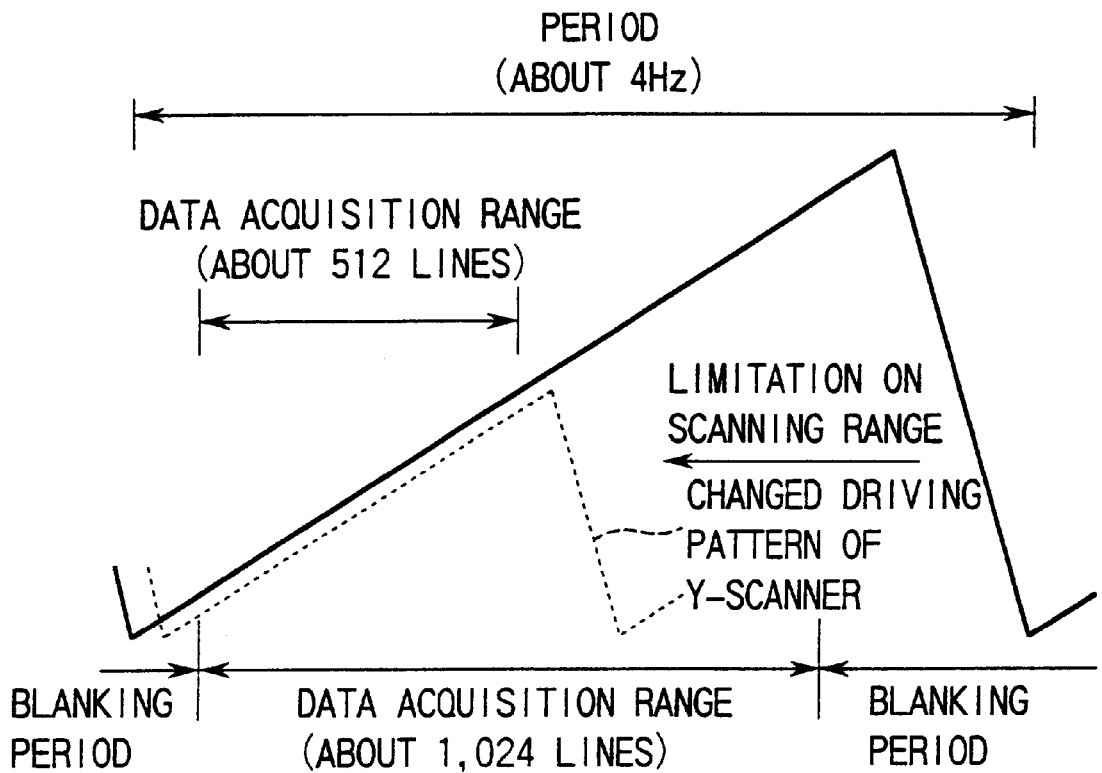
FIG. 5 is a view showing the driving pattern of Y scanning when the two-dimensional scanning range of a laser beam is designated.

The driving pattern of a general Y-scanner is a waveform as represented by the solid line in FIG. 5.

Its period is about 4 Hz, and the pattern is divided into a scanning valid region (1,024 lines) and an invalid region (laser blanking period).

The invalid region is determined in consideration of the time required for the computer 21 to perform image calculation such as extension.

The designation region Q is designated in a displayed image, as shown in FIG. 4, and extended scanning starts. Then, the computer 21 instructs the two-dimensional scanning driving control circuit 13 to switch the driving pattern of the Y-scanner to the one represented by the broken line in FIG. 5. At this time, half the entire scanning range in the Y direction is designated as the designation region Q, and the valid region is decreased to 512 lines.

That is, measurement data is acquired from only a rectangular region of 1,024 pixels×512 lines which is half the original region.

Accordingly, image information of the sample within the designated range is acquired (FIG. 6:S3). The period of Y-scanning is substantially halved (about 8 Hz). In this setting, the total data acquisition time is about 70 sec (about 30 sec for image acquisition, and about 40 sec for movement of the objective lens) for 200 steps, and about 330 sec for 1,000 steps. As the number of images to be acquired is larger, the effects become more prominent.

The ratio of the blanking period can be actually ignored up to about 128 lines (⅛) of the valid region, and the image update rate is about 30 Hz.

The image update rate can be further increased, but the response speed of the scanner and the calculation time are limited to justify the effects. For example, the image is distorted near two ends in the Y direction, or calculation cannot be completed during the blanking period. In 128-line setting, the total data acquisition time is about 50 sec (about 10 sec for image acquisition and about 40 sec for movement of the objective lens) for 200 steps, and about 240 sec (about 4 min) for 1,000 steps.

The method of designating the designation region Q is not limited to the above one. The width of the designation region Q in the Y scanning direction can be set to an arbitrary number of lines in accordance with the size of an object to be inspected (valid data acquisition region). For example, this embodiment can designate a designation region Q' in the Y scanning direction equal to the diameter of a region containing top data of the hemisphere 26 shown in FIG. 4.

The position in the Y direction is not limited to the center, but can be freely set in the vertical direction depending on a portion to be inspected on sample. As the two-dimensional scanning means, another scanner may be used.

When all the data of a general scanning region are not effectively used because the measurement region is limited, only specific part of data is required, or the number of measurement images to be acquired is large, the Y-scanning region is limited to increase the image update speed. Thus, the two-dimensional scanning mechanism 12 operates in accordance with an instruction from the scanning range designation means 23.

In this manner, the first embodiment employs the scanning range designation means 23 for designating the Y-scanning range of a laser beam with respect to the sample 4. By changing the information amount (scanning amount) in the sub-scanning direction (Y direction) of two-dimensional scanning, a necessary region can be measured at a high speed regardless of the scanning means, magnification (observation field of view), and resolution in measuring, e.g., the height between the substrate 25 and the top of the solder ball 26 on the sample 4.

Second Embodiment

The second embodiment of the present invention will be described. Note that a microscope according to the second embodiment has almost the same arrangement as that in FIG. 2, and a detailed description thereof will be omitted by referring to FIG. 2.

Figure 7:
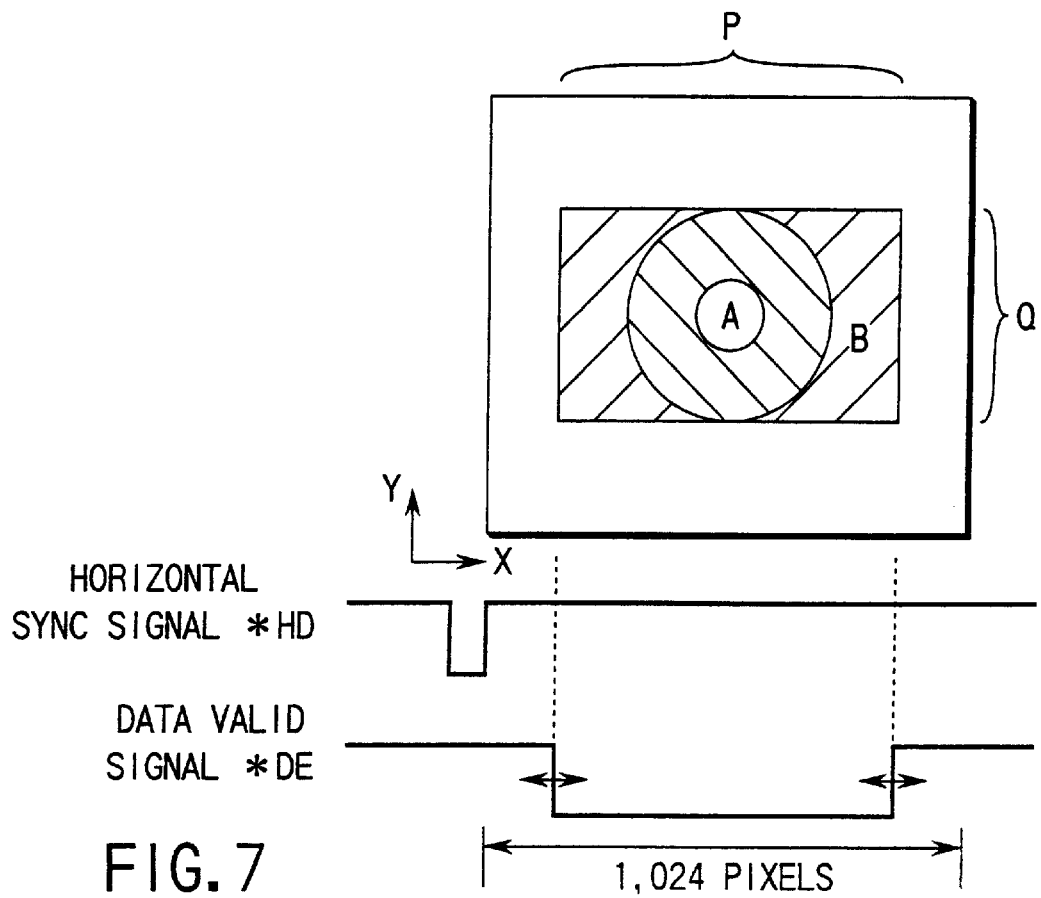
FIG. 7 is a schematic view when an image of a region designated in the X direction is to be acquired from a sample image.

A scanning range designation means 30 of a computer 21 has a function of designating the Y-scanning range of a laser beam with respect to a sample 4, and a function of a data acquisition range designation means for designating, as valid information with an input device 24, only a designation region P shown in FIG. 7 from image data obtained from an output signal from a photodetector 20.

The effects of the microscope having this arrangement will be explained with reference to FIG. 8.

Similar to the first embodiment, a laser beam emitted by a laser source 10 is guided to a two-dimensional scanning mechanism 12 via the mirror 11, and scanned along the X- and Y-axes by the two-dimensional scanning mechanism 12 to scan and illuminate the sample 4 as a light spot via an objective lens 14.

On the other hand, light reflected by the sample 4 passes through the objective lens 14 to return to the two-dimensional scanning mechanism 12, and is incident on the photodetector 20 from the two-dimensional scanning mechanism 12 via a half-mirror 17, lens 18, and pinhole plate 19.

The photodetector 20 photoelectrically converts the incident light reflected by the sample 4, and sends the signal to the computer 21.

Figure 8:
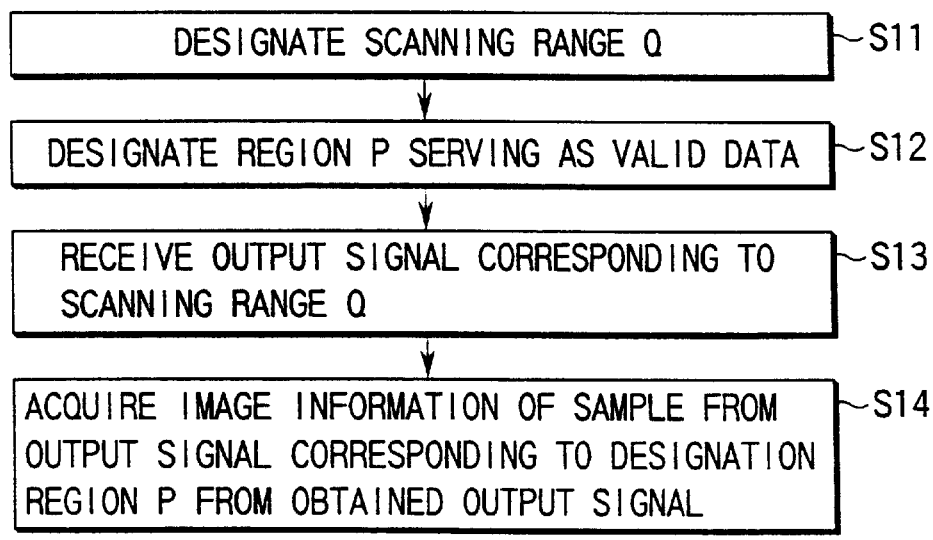
FIG. 8 is a flow chart for explaining the operation of a scanning confocal microscope according to the second embodiment of the present invention.

In the second embodiment, the operator designates, with the input device 24 on the basis of surface information (nonconfocal image) of the sample 4 displayed on a monitor 22, the designation region Q for designating the Y-scanning range of a laser beam, and the designation region P serving as valid data among image information captured within the range of the designation region Q, as shown in FIG. 7 (FIG. 8:S11 and S12). The scanning range designation means 30 of the computer 21 sends information of the designated designation region Q to a two-dimensional scanning driving control circuit 13, which controls Y-scanning of a laser beam.

The computer 21 receives an output signal from the photodetector 20 that is attained when Y-scanning of a laser beam is controlled to the designation region Q (FIG. 8:S13). In acquiring an image of the sample 4 based on the designation region P designated by the scanning range designation means 30 of the computer 21, an imaging data valid signal supplied from the two-dimensional scanning driving control circuit 13 to the computer 21 is processed as shown in FIG. 7 (FIG. 8:S14).

More specifically, a horizontal sync signal (*HD) is a timing signal which represents the start of one line, and a data valid signal (*DE) is a timing signal which represents a period during which the image has a valid pixel.

A pixel portion corresponding to the period *DE, i.e., data valid pixel portion P in the X direction is limited by an instruction P from the scanning range designation means 30 that is designated by an input from the operator.

For calculation, the computer 2 uses only the pixel portion P out of 1,024 pixels of one line as measurement data.

Accordingly, the number of data in the X direction decreases, and the data amount which must be calculated during the blanking period also decreases. In other words, the blanking period can also be shortened to shorten the measurement data acquisition time.

In the second embodiment, only image information in the data acquisition range P is acquired as valid data from image information obtained by designating the Y-scanning range Q of a laser beam with respect to the sample 4. The second embodiment can reduce data in combination with the first embodiment which can decrease the number of lines in the Y direction.

Accordingly, an arbitrary rectangular region of an image displayed by general scanning can be designated by the scanning range designation means 30.

Since the calculation amount decreases, a high-speed arithmetic unit, e.g., a CPU need not be prepared in relation to the scanning rate. Similar to the first embodiment, a necessary region can be measured at a high speed regardless of the scanning means, magnification, and resolution in measuring the sample 4.

Note that the present invention is not limited to the first and second embodiments, and may be modified as follows.

For example, the second embodiment designates the region designation Q for the scanning range in the Y direction, and the region designation Q for a data valid range. Alternatively, only the designation region P may be designated for the data acquisition range in the X direction without designating any scanning range in the Y direction.

In addition, the designation regions P and Q can be designated for the data acquisition ranges in the X and Y directions. This can reduce the calculation amount of image processing, and measure only a necessary region at a high speed.

As described in detail, the present invention can provide a scanning confocal microscope capable of measuring a necessary region at a high speed regardless of the scanning means, magnification, and resolution in measuring a sample.

Third Embodiment

Figure 9:
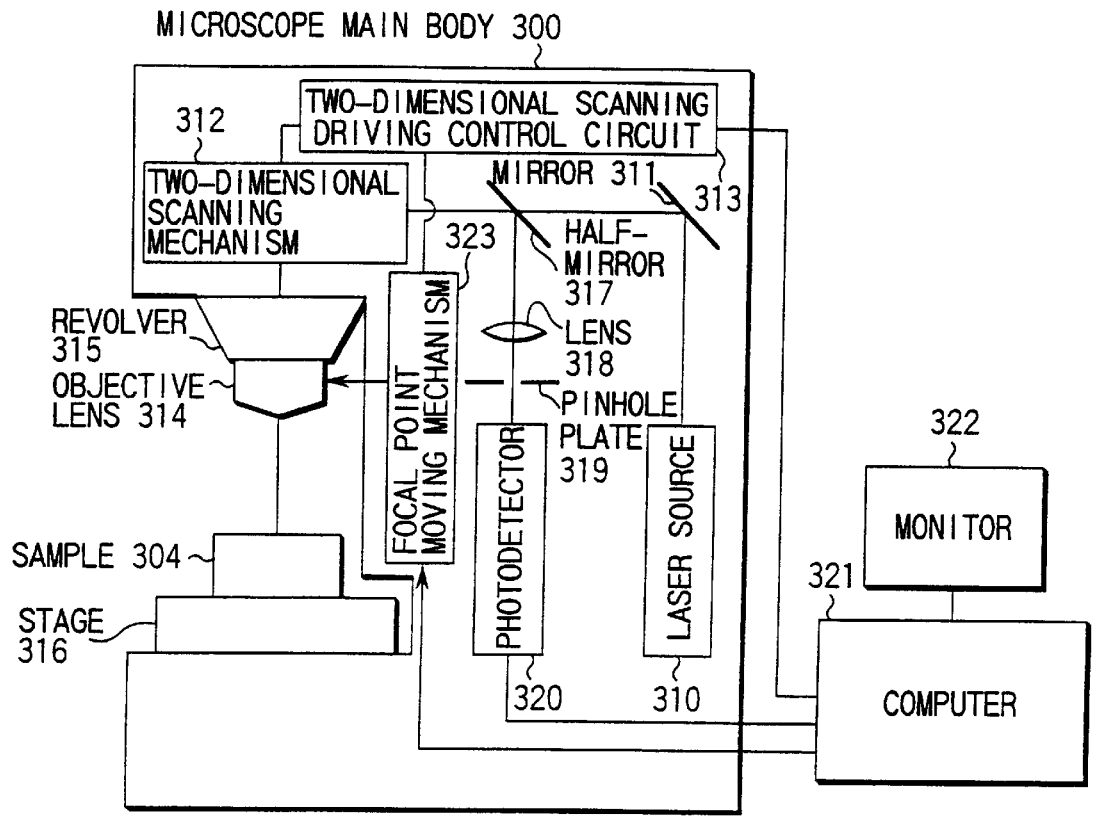
FIG. 9 is a block diagram showing a scanning confocal microscope according to the third embodiment of the present invention.

FIG. 9 shows the schematic arrangement of a scanning confocal microscope to which the present invention is applied.

In FIG. 9, reference numeral 300 denotes a microscope main body. The microscope main body 300 comprises a laser source 310. The laser source 310 generates a laser beam as a light spot (focused light) for scanning the surface of a sample 304. A mirror 311 is inserted in the optical axis of the laser source 310. The mirror 311 is a reflecting mirror for guiding a laser beam from the laser source 310 to a two-dimensional scanning mechanism 312.

The two-dimensional scanning mechanism 312 two-dimensionally scans the sample with a laser beam from the laser source 310 that is obtained via the mirror 311, as a light spot in the X and Y directions under the control of a two-dimensional scanning driving control circuit 313.

The light spot two-dimensionally scanned via the two-dimensional scanning mechanism 312 illuminates the sample 304 placed on a stage 316 via an objective lens 314.

The objective lens 314 is attached to a revolver 315. The revolver 315 holds a plurality of objective lenses 314 having different magnifications. The revolver 315 can set an objective lens 314 having a desired magnification among these objective lenses 314 to a position along the optical observation axis of the microscope. At the same time, the revolver 315 can move the focal point of the objective lens 314 to the optical axis in accordance with an instruction from a focal point moving mechanism 323 (to be described later).

On the other hand, light reflected by the sample 304 passes through the objective lens 314 to return to the two-dimensional scanning mechanism 312, and returns to a half-mirror 317 via the two-dimensional scanning mechanism 312.

The half-mirror 317 is a semitransparent mirror which is inserted in the exit optical axis of the laser source 310 extending to the two-dimensional scanning mechanism 312, and guides, to a detection system, light reflected by the sample 304 that is obtained via the two-dimensional scanning mechanism 312.

The light reflected by the sample 304 that is obtained via the half-mirror 317 passes through a lens 318, and is received by a photodetector 320 via the pinhole of a pinhole plate 319.

The lens 318 focuses the light reflected by the sample 304. The pinhole plate 319 has a pinhole with a desired diameter, and is located at the focal position of the lens 318 in front of the light-receiving surface of the photodetector 320.

The photodetector 320 is formed from a photodetection element for converting light obtained via the pinhole of the pinhole plate 319 into an electrical signal corresponding to the light quantity.

The signal photoelectrically converted by the photodetector 320 is sent together with a timing signal from the two-dimensional scanning driving control circuit 313 to a computer 321 where the signal is converted into an image. The image is displayed as surface information of the sample 304 on a monitor 322.

The computer 321 is connected to the focal point moving mechanism 323. The focal point moving mechanism 323 is connected to the revolver 315 and two-dimensional scanning driving control circuit 313, and can synchronously control focal movement of the revolver 315 and two-dimensional scanning of the two-dimensional scanning mechanism 312 in accordance with an instruction from the computer 321.

Figure 10:
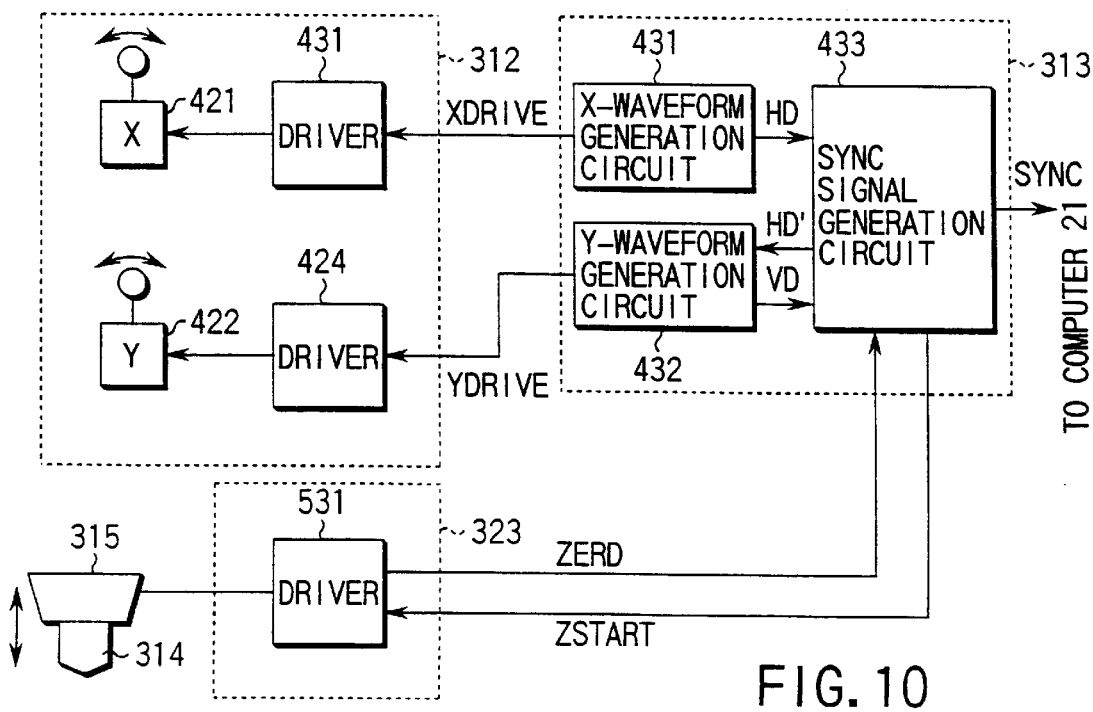
FIG. 10 is a block diagram for explaining the main part of the scanning confocal microscope according to the third embodiment.

FIG. 10 is a block diagram for explaining the main part of the scanning confocal microscope having this arrangement in more detail.

The two-dimensional scanning mechanism 312 has an X-scanner 421 formed from, e.g., a galvanoscanner or resonant scanner for X-scanning and a Y-scanner 422 formed from, e.g., a galvanoscanner for Y-scanning. The X-scanner 421 is driven by a driver 423 to perform main scanning of two-dimensional scanning, whereas the Y-scanner 422 is driven by a driver 424 to perform sub-scanning of two-dimensional scanning.

The focal point moving mechanism 323 has a driver 531, and moves the focal point of the objective lens 314 by the revolver 315.

The two-dimensional scanning driving control circuit 313 comprises an X waveform generation circuit 431, Y waveform generation circuit 432, and sync signal generation circuit 433.

The X waveform generation circuit 431 includes, e.g., an address counter and waveform memory. The X waveform generation circuit 431 outputs a driving signal XDRIVE to the driver 423 of the two-dimensional scanning mechanism 312 to control main scanning of two-dimensional scanning by the X-scanner 421, and outputs a horizontal sync signal HD every 1-line scanning.

The Y waveform generation circuit 432 includes, e.g., an address counter and waveform memory. The Y waveform generation circuit 432 operates by a timing signal HD' from the x waveform generation circuit 431 via the sync signal generation circuit 433. The Y waveform generation circuit 432 outputs a driving signal YDRIVE to the driver 424 of the two-dimensional scanning mechanism 312 to control sub-scanning of two-dimensional scanning by the Y-scanner 422, and outputs a vertical sync signal VD every 1-frame scanning.

The sync signal generation circuit 433 outputs a sync signal SYNC necessary for displaying an image of the sample 304 on the monitor 322 in response to the horizontal sync signal HD from the X waveform generation circuit 431 every 1-line scanning and the vertical sync signal VD from the Y waveform generation circuit 432 every 1-frame scanning. Further, the sync signal generation circuit 433 outputs to the driver 531 of the focal point moving mechanism 323 a movement start signal ZSTART for moving the focal point by the revolver 315. When the revolver 315 moves by a predetermined distance, the sync signal generation circuit 433 receives a movement end signal ZEND from the driver 531.

The effects of the third embodiment having the above arrangement will be explained.

A laser beam emitted by the laser source 310 is guided to the two-dimensional scanning mechanism 312 via the mirror 311, and two-dimensionally scanned along the X- and Y-axes by the two-dimensional scanning mechanism 312. The scanned laser beam scans and illuminates the sample 304 as a light spot via the objective lens 314.

On the other hand, light reflected by the sample 304 passes through the objective lens 314 to return to the two-dimensional scanning mechanism 312, and is incident on the photodetector 320 from the two-dimensional scanning mechanism 312 via the half-mirror 317, lens 318, and pinhole plate 319. The light is photoelectrically converted by the photodetector 20, and sent as an electrical signal to the computer 321.

In this case, two-dimensional scanning by the two-dimensional scanning mechanism 312 is controlled by the two-dimensional scanning driving control circuit 313. The X waveform generation circuit 431 shown in FIG. 10 prepares a waveform pattern shown in FIG. 11. When two-dimensional scanning starts, an address counter (not shown) operates to increment the address to A→B→C→A. Then, the X waveform generation circuit 431 outputs a periodic driving waveform XDRIVE shown in FIG. 12(a) to the driver 423 of the two-dimensional scanning mechanism 312.

When the driver 423 receives the driving waveform XDRIVE, it drives the X-scanner 421 to execute main scanning of two-dimensional scanning. At the same time, the X waveform generation circuit 431 outputs a signal of the driving waveform XDRIVE that represents the start of the blanking period, i.e., horizontal sync signal HD (FIG. 12(b)) every 1-line scanning.

Then, pixel data of one line of the sample 304 is obtained between A and B of the driving waveform XDRIVE (by, e.g., 1,024 pixels).

On the other hand, when the X waveform generation circuit 431 outputs the horizontal sync signal HD, the timing signal HD' shown in FIG. 12(c) is supplied to the Y waveform generation circuit 432 via the sync signal generation circuit 433.

Figure 12:
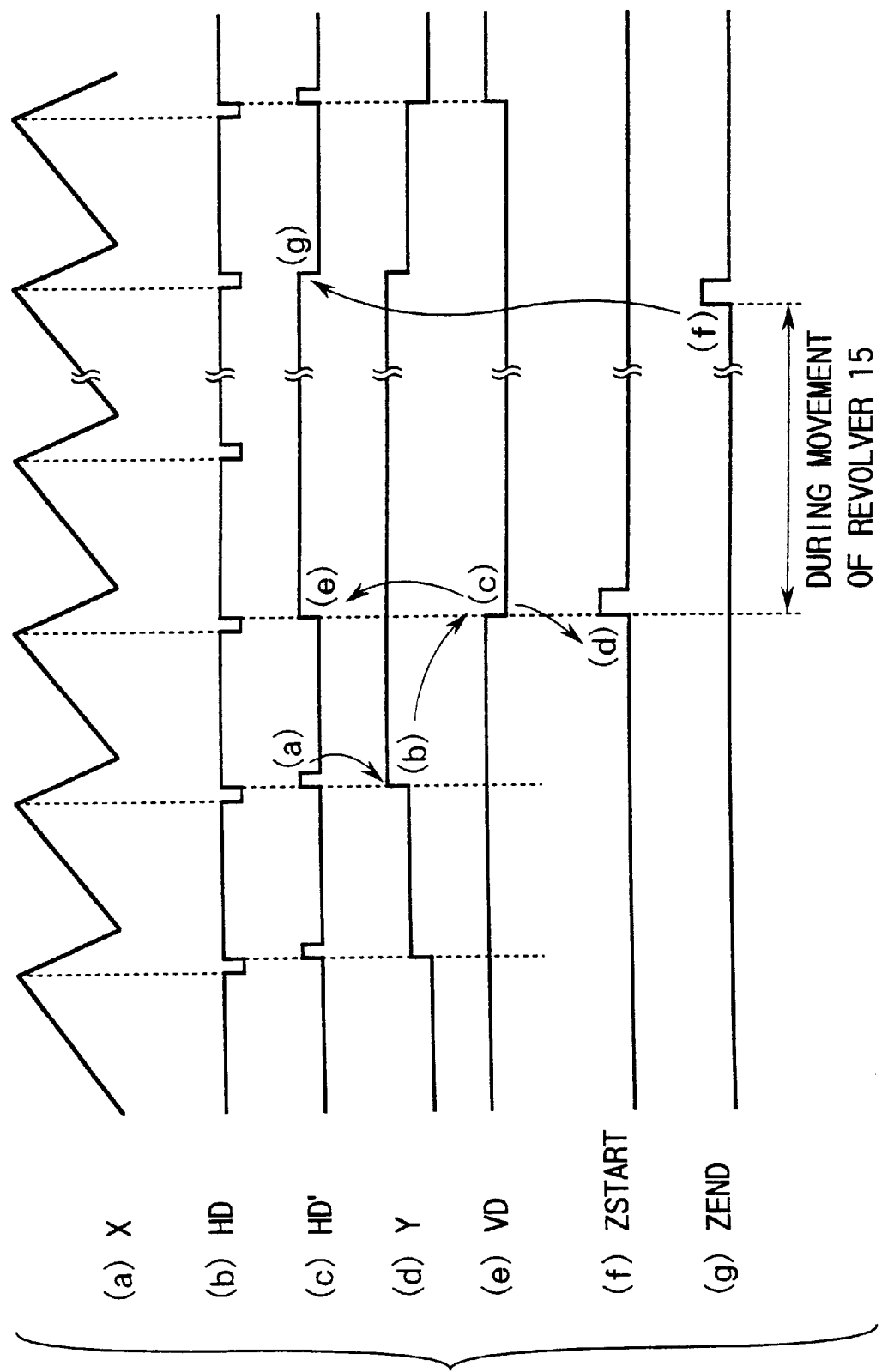
FIG. 12 is a timing chart for explaining the operation of the scanning confocal microscope according to the third embodiment.

In this case, the Y waveform generation circuit 432 prepares a waveform pattern shown in FIG. 12, similar to the X waveform generation circuit 431. The Y waveform generation circuit 432 receives the timing signal HD' via the sync signal generation circuit 433 to increment the address every line, and outputs a periodic driving waveform YDRIVE shown in FIG. 12(d) corresponding to A→B→C→A to the driver 424 of the two-dimensional scanning mechanism 312.

When the driver 424 receives the driving waveform YDRIVE, it drives the Y-scanner 422 to perform sub-scanning of two-dimensional scanning. At the same time, the Y waveform generation circuit 432 outputs a signal of the driving waveform YDRIVE that represents the start of the blanking period, i.e., vertical sync signal VD shown in FIG. 12(e) every 1-frame scanning.

As a result, pixel data of one frame of the sample 304 is obtained between A and B of the driving waveform YDRIVE (by, e.g., 768 pixels). These operations are repeated to display an image of the sample 304 on the monitor 322 via the computer 321.

Extended scanning will be described.

In this case, the moving distance of the revolver 315 for each frame is set in advance by the computer 321 for the driver 531 of the focal point moving mechanism 323.

From this state, the computer 321 instructs the sync signal generation circuit 433 of the two-dimensional scanning driving control circuit 313 to perform extended scanning.

When the Y waveform generation circuit 432 receives the timing signal HD' supplied via the sync signal generation circuit 433 at, e.g., point a in FIG. 12(c), it outputs the driving waveform YDRIVE to the driver 424 of the two-dimensional scanning mechanism 312 at point b in FIG. 12(d).

Figure 11:
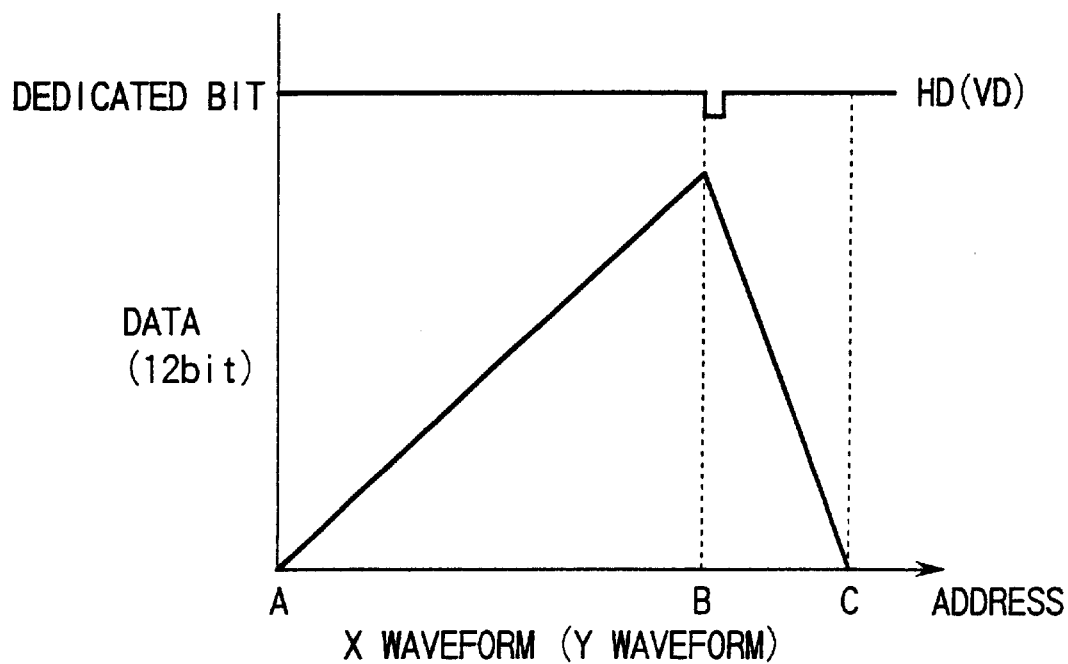
FIG. 11 is a view for explaining the operation of the scanning confocal microscope according to the third embodiment.

In this case, the Y-scanner 422 starts sub-scanning of two-dimensional scanning at point A of the waveform memory shown in FIG. 11. The Y-scanner 422 captures image data of one frame (768 lines) till point B of FIG. 11, and outputs the vertical sync signal VD at point c in FIG. 12(e).

Then, the sync signal generation circuit 433 outputs the revolver moving signal ZSTART to the driver 531 of the focal point moving mechanism 323 at point d in FIG. 12(f), and the revolver 315 starts moving by a predetermined distance in accordance with the revolver moving signal ZSTART.

At the same time, the timing signal HD' for driving the address counter of the Y waveform generation circuit 432 is masked from point e in FIG. 12(c) in response to the vertical sync signal VD at point c in FIG. 12(e).

In this case, the Y waveform generation circuit 432 whose address counter stops is held at point B in FIG. 11. While the revolver 315 moves, sub-scanning of two-dimensional scanning temporarily suspends.

After the revolver 315 has moved by the predetermined distance, the driver 531 outputs the movement completion signal ZEND to the sync signal generation circuit 433 at point f in FIG. 12(g).

When the sync signal generation circuit 433 receives this movement completion signal ZEND, the mask of the timing signal HD' is canceled at point g in FIG. 12(c), and the timing signal HD' is validated at the timing of the next main scanning. The Y waveform generation circuit 432 returns to normal operation, and shifts to the next frame scanning.

In this manner, extended scanning is performed in which every time an image of one frame is captured by two-dimensional scanning at a focal position, focal movement is done by a predetermined moving amount to move the focal position to the next one, and an image of one frame is captured by two-dimensional scanning.

This arrangement enables controlling the sub-scanning period of two-dimensional scanning by the Y-scanner 422 of the two-dimensional scanning mechanism 312 on the basis of the focal position of the revolver 315 in extended scanning, and shifting to processing for the next frame scanning in correspondence with the moving distance of the revolver 315. This can absorb any asynchronization between two-dimensional scanning and adjustment movement of the focal position between two adjacent focal positions during extended scanning.

Hence, if the focal position has been moved during the blanking period of ' conventional scanning, capture of the next image suspends (data is not acquired). Compared to this, this embodiment can eliminate any wasteful two-dimensional scanning period (idle period during which data cannot be acquired) to greatly shorten the image capture time.

Further, this embodiment can always capture accurate image information in comparison with a case wherein an image is acquired by obliquely scanning a sample because the focal position is moved while an image is captured by two-dimensional scanning in order to shorten the conventional image capture time.

The first or second embodiment can be combined with the third embodiment to further shorten the image capture time, compared to image capture by conventional two-dimensional scanning.

Fourth Embodiment

The fourth embodiment of the present invention will be described.

The arrangements in FIGS. 9 and 10 described in the third embodiment are also the same in the fourth embodiment, so that the fourth embodiment quotes FIGS. 9 and 10. Also, the fourth embodiment quotes the waveform pattern of the waveform memory of the X waveform generation circuit 431 shown in FIG. 11.

Figure 13:
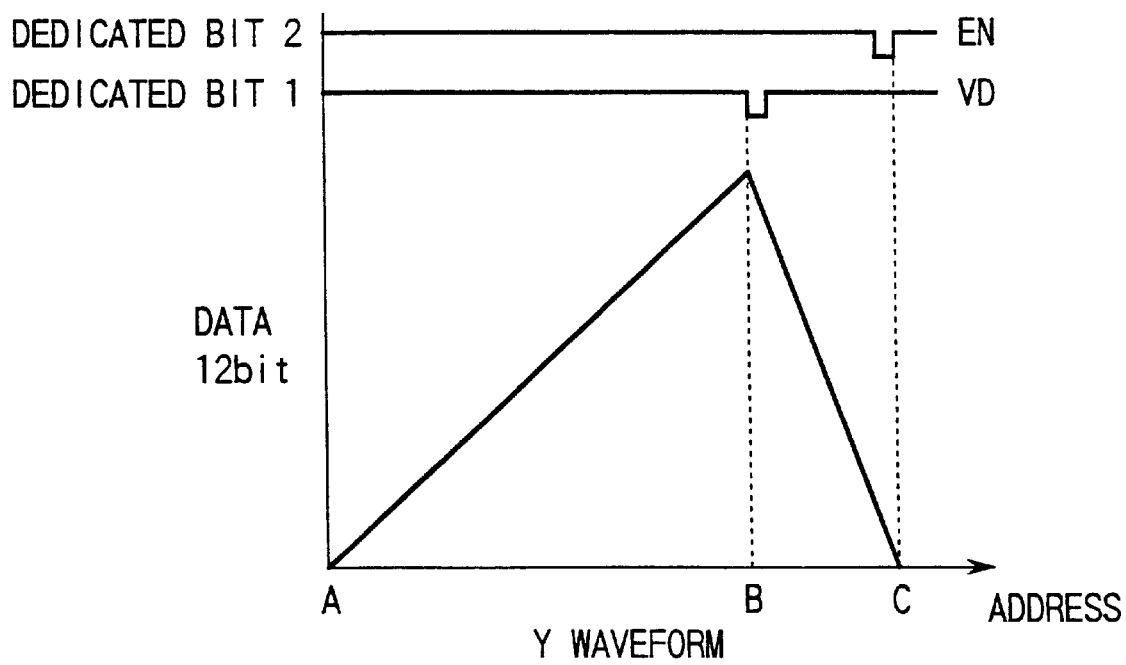
FIG. 13 is a view for explaining a scanning confocal microscope according to the fourth embodiment of the present invention.

As shown in FIG. 13, the waveform pattern of the waveform memory of a Y waveform generation circuit 432 outputs a vertical sync signal VD to address B of the waveform memory, and a control signal EN to address C.

Even with this processing, if image data of a given frame is acquired, the focal point of a revolver 315 moves by a preset distance. This operation is the same as in the third embodiment.

In this case, two-dimensional scanning does not stop even during the vertical blanking period (address B→C) of the waveform pattern shown in FIG. 13. Even if the focal movement distance (time) of the revolver 315 is small, the revolver 315 has moved during a vertical blanking period of B→C, and the control signal EN is sent to a sync signal generation circuit 433 after the movement completion signal ZEND, data of successive frames can be acquired without stopping two-dimensional scanning.

If the focal movement distance (time) of the revolver 315 is large, movement of the revolver 315 is not completed during a vertical blanking period of B→C, the revolver 315 still moves in the next frame, and the movement completion signal ZEND is sent to the sync signal generation circuit 433 after the control signal EN, two-dimensional scanning temporarily suspends upon generation of the control signal EN, and scanning of the next frame restarts upon reception of the movement completion signal ZEND from the driver 531.

Since a vertical blanking period of B→C can be effectively used for the movement period of the revolver 315 for adjusting the focal position, more efficient acquisition of image information can be expected.

In the above embodiments, light reflected by a sample is used. Instead, fluorescence or transmitted light may be used.

As has been described above, the present invention can absorb any asynchronization between two-dimensional scanning by the two-dimensional scanning means and movement of the focal position by the focal position adjustment means along with movement of successive focal positions during extended scanning. The present invention can eliminate any wasteful two-dimensional scanning period (idle period during which data cannot be acquired) to efficiently acquire accurate image information within a short time.

According to the present invention, the period between the vertical sync signal of the two-dimensional scanning means and a successively output control signal can be used for adjustment of the focal position by the focal position adjustment means. Thus, more efficient acquisition of image information can be expected.

The present invention can be applied to a scanning confocal microscope for increasing the processing speed by improving scanning control of focused light with respect to a sample and data processing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A scanning confocal microscope for obtaining three-dimensional information of a sample by repeating two-dimensional scanning of the sample and processing of relatively moving the sample and a focal position of an objective lens along an optical path of light passing through the objective lens, comprising:

two-dimensional scanning means having first scanning means for scanning the sample with focused light in one axial direction, and second scanning means for scanning the sample with the focused light in an axial direction perpendicular to the direction in which the sample is scanned with the focused light by said first scanning means;

scanning range designation means for designating a two-dimensional scanning range of the focused light with respect to the sample;

control means for outputting a first driving signal for driving said first scanning means and a second driving signal for driving said second scanning means, and when said scanning range designation means designates the two-dimensional scanning range, scanning the sample with the focused light within the designated two-dimensional scanning range of the sample;

light-receiving means for receiving one of light reflected by the sample, fluorescence, and transmitted light of the focused light two-dimensionally scanned by said two-dimensional scanning means; and image acquisition means for acquiring an image of the sample on the basis of one of the reflected light, the fluorescence, and the transmitted light that is received by said light-receiving means.

2. A scanning confocal microscope according to claim 1, wherein control of the second driving signal by said control means includes control of waveform information of the second driving signal.

3. A scanning confocal microscope according to claim 1, wherein said scanning range designation means has a function of designating a data acquisition range on image data of the sample obtained based on one of the reflected light, the fluorescence, and the transmitted light that is received by said light-receiving means, and said control means has a function of, when said scanning range designation means designates the two-dimensional scanning range, acquiring an image of the sample based on image data within the data acquisition range designated by said scanning range designation means out of the image data of the sample obtained based on one of the reflected light, the fluorescence, and the transmitted light that is received by said light-receiving means.

4. A scanning confocal microscope according to claim 1, further comprising:

moving means for relatively moving the sample and the focal position of the objective lens along the optical path; and inhibition means for inhibiting two-dimensional scanning of said two-dimensional scanning means during a relative movement period of the sample and the focal point of the objective lens by said moving means.

5. A scanning confocal microscope according to claim 4, wherein said inhibition means manages a horizontal sync signal output every 1-line scanning of said two-dimensional scanning means and a vertical sync signal output every frame scanning, instructs said moving means to start adjusting the focal position and inhibits two-dimensional scanning of said two-dimensional scanning means in response to the vertical sync signal, and starts two-dimensional scanning of said two-dimensional scanning means after said moving means adjusts the focal position.

6. A scanning confocal microscope according to claim 4, wherein said inhibition means further manages a control signal output subsequently to the vertical sync signal of said two-dimensional scanning means, when end of adjustment of the focal position by said moving means is informed before the control signal, does not inhibit two-dimensional scanning of said two-dimensional scanning means, when end of adjustment of the focal position by said moving means is informed after the control signal, temporarily inhibits two-dimensional scanning of said two-dimensional scanning means upon generation of the control signal, and starts two-dimensional scanning of said two-dimensional scanning means after end of adjustment of the focal position.

* * * * *